United States Patent
Ruch et al.

(10) Patent No.: US 11,578,799 B2
(45) Date of Patent: Feb. 14, 2023

(54) PISTON RING AND PISTON RING/PISTON COMBINATION WITH IMPROVED WEAR PROPERTIES

(71) Applicant: FEDERAL-MOGUL BURSCHEID GMBH, Burscheid (DE)

(72) Inventors: Fabian Ruch, Leverkusen (DE); Nigel Gray, Leverkusen (DE); Oliver Nickisch, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 116 days.

(21) Appl. No.: 17/045,342

(22) PCT Filed: Mar. 18, 2019

(86) PCT No.: PCT/EP2019/056662
§ 371 (c)(1),
(2) Date: Oct. 5, 2020

(87) PCT Pub. No.: WO2019/192828
PCT Pub. Date: Oct. 10, 2019

(65) Prior Publication Data
US 2022/0107022 A1  Apr. 7, 2022

(30) Foreign Application Priority Data
Apr. 3, 2018 (DE) ............... 10 2018 107 793.9

(51) Int. Cl.
*F16J 9/20* (2006.01)
(52) U.S. Cl.
CPC ..................... *F16J 9/20* (2013.01)

(58) Field of Classification Search
CPC . F16J 9/20; F16J 9/22; F16J 9/12; F02F 5/00
See application file for complete search history.

(56) References Cited

U.S. PATENT DOCUMENTS 5,692,758 A  * 12/1997 Wikstrom ............. F16J 15/106
                                                277/591
7,354,045 B2 *  4/2008 Abe ....................... F16J 9/206
                                                277/435

(Continued)

FOREIGN PATENT DOCUMENTS

| DE | 3511851 A1 | 10/1986 |
| EP | 2045488 A1 | 4/2009 |
| JP | 2003328852 A | 11/2003 |

OTHER PUBLICATIONS

International Search Report, dated July 2, 2 019 (PCT/EP2019/056662).

*Primary Examiner* — Grant Moubry
(74) *Attorney, Agent, or Firm* — Robert L. Stearns; Dickinson Wright, PLLC

(57) ABSTRACT

A piston ring with improved wear properties has a running surface, an upper ring flank, a lower ring flank, and an inner surface. The piston ring has a radius R, and wherein in a radial section, a running surface contour includes an upper region, a central region, and a lower region. The upper region of the running surface contour has a curvature radius $R_o$, which lies between the ring radius R and infinity. The central region of the running surface contour has a curvature radius $R_m$, which lies between the ring radius R and infinity. The lower region has a curvature radius $R_u$, which is smaller than the ring radius R.

19 Claims, 2 Drawing Sheets

(56) References Cited

U.S. PATENT DOCUMENTS

| | | | | |
|---|---|---|---|---|
| 8,157,268 B2* | 4/2012 | Tomanik | ............... | F16J 9/20 |
| | | | | 277/496 |
| 9,791,045 B2* | 10/2017 | Fukuma | ............... | F16J 9/206 |
| 2004/0012153 A1 | 1/2004 | Yoshida et al. | | |
| 2015/0267813 A1* | 9/2015 | Williams | ............... | F02F 3/00 |
| | | | | 123/193.6 |
| 2016/0040780 A1* | 2/2016 | Donahue | ............... | F16J 9/064 |
| | | | | 123/193.4 |

* cited by examiner

PISTON RING AND PISTON RING/PISTON COMBINATION WITH IMPROVED WEAR PROPERTIES

BACKGROUND

1. Technical Field

The present invention relates to piston rings for piston engines, in particular for internal combustion engines.

2. Related Art

A very large number of various types of piston rings are currently known.

It is still desirable, however, to have a piston ring, which has improved properties with regard to wear and reduced blowby.

SUMMARY

According to a first aspect of the present invention, a piston ring with improved wear properties is provided; the improved piston ring has a piston ring body with a running surface, an upper ring flank, a lower ring flank, and an inner surface. In an installed state, the piston ring has a radius R. A running surface or outer jacket surface, respectively, or outer surface, respectively, comprises an upper region, a central region, and a lower region. The upper region, the central region, and the lower region, in each case extend in the axial and circumferential direction, wherein they are located directly next to one another or one on top of the other, respectively, or separated by transition regions, in the axial direction. The term "top" is to be understood here as "on the combustion chamber side", and the term "bottom" is to be understood as "on the crankshaft side". The central region is to thereby represent that part of the piston ring, with which the piston ring is actually in contact with an inner cylinder surface of a piston engine. The upper region of the running surface contour thereby has a curvature radius $R_o$, which lies between the ring radius R and infinity. The central region of the running surface contour has a curvature radius $R_m$, which lies between the ring radius R and infinity. The lower region has a curvature radius $R_u$, which is smaller than the ring radius R.

An embodiment of the piston ring has an average tangent angle of the upper region of the running surface contour, which is between 2 to 40, preferably 4 to 30 times, and more preferably 10 to 20 times as large as an average tangent angle of the central region. The tangent angle is thereby defined as the angle of a tangent at the curvature radius $R_o$ or $R_n$, the base point of which follows from the angle bisector of the extension of the curvature of the upper or central region, respectively, to the axial direction of the piston ring. The upper or central region, respectively, in each case has a curvature radius in an angular range.

According to a further embodiment of the piston ring, the upper region of the running surface contour has a curvature radius $R_o$, which lies between the ring radius R and 4R, and the central region of the running surface contour has a curvature radius $R_m$, which lies between the ring radius R and 4R, and the lower region has a curvature radius $R_u$, which is smaller than ½ R.

In the case of another embodiment of the piston ring, the upper region of the running surface contour has a curvature radius $R_o$, which lies between the ring radius R and 4R, the central region of the running surface contour has a curvature radius $R_m$, which lies between the ring radius R and 4R, and the lower region has a curvature radius $R_u$, which is smaller than ½ R. The lower region thus has a significantly smaller curvature radius than the two upper regions.

In the case of an additional embodiment of the piston ring, the upper region of the running surface contour has a curvature radius $R_o$, which lies between the ring radius R and 2R, the central region of the running surface contour has a curvature radius $R_m$, which lies between the ring radius R and 2R, and the lower region has a curvature radius $R_u$, which is smaller than a ring height h. The ring height is defined as a largest distance between the lower ring flank and the upper ring flank. These embodiments also cover piston rings, the running surface of which comprise a (partial) surface of a spindle to horn torus with a ratio R/r of between 1 and 2.

A further embodiment of the piston ring is characterized in that the upper region of the running surface contour has a curvature radius $R_o$, which lies between the ring radius R and 1.5R, the central region of the running surface contour has a curvature radius $R_m$, which lies between the ring radius R and 1.5R, and the lower region has a curvature radius $R_u$, which is smaller than half a ring height h. The curvature radius of the running surface is thus based directly on the radius of the piston ring, and the running surface has a virtually spherical surface. These embodiments also cover piston rings, the running surface of which have a (partial) surface of a spindle torus with a ratio R/r (wherein R and r represent the torus parameters here) of between 1 and 1.5, which also includes the case of the degeneracy to the sphere (in the case of which the torus parameter R equals 0), in the case of which the central region forms a part of a spherical surface.

Moreover, the area of the upper region generally does not form an area of the ellipsis, but part of a torus surface.

A further embodiment of the present piston ring is characterized in that the ring contour has, in a radial section between the upper region and the central region, an upper transition region, which has a rounding radius $R_{ü,om}$, which lies between 1/100 and the ring height h, preferably between 1/50 and 1/5 of the ring height h, and more preferably between 1/30 and 1/10 of the ring height h.

In the case of an additional embodiment of the piston ring, the ring contour has, in a radial section between the upper region and the central region, an upper transition region, which has a rounding radius $R_{ü,om}$, which is between 0.002 and 0.5 mm, preferably between 0.05 and 0.04 mm, and more preferably between 0.1 and 0.3 mm.

In the case of a further embodiment of the present piston ring, the ring contour has, in a radial section between the central region and the lower region, a lower transition region, which has a rounding radius $R_{ü,mu}$, which is between 1/100 and the ring height h, preferably between 1/50 and 1/5 of the ring height h, and more preferably between 1/30 and 1/10 of the ring height h. The size of the rounding radius is also defined by a dimension of the piston ring here.

In the case of a further embodiment of the piston ring, the ring contour has, in a radial section between the upper region and the central region, an upper transition region, which has a rounding radius $R_{ü,om}$, which is between 0.002 and 0.5 mm, preferably between 0.05 and 0.4 mm, and more preferably between 0.1 and 0.3 mm.

In the case of another exemplary embodiment of the piston ring, the lower curvature radius $R_u$ is larger than the rounding radius $R_{ü,mu}$ and/or $R_{ü,om}$, preferably at least 5 times as large as $R_{ü,mu}$ and/or $R_{ü,om}$, and more preferably at least 10 times as large as $R_{ü,mu}$ and/or $R_{ü,om}$.

In the case of an exemplary embodiment of the piston ring, the central curvature radius $R_m$ is larger than the upper curvature radius $R_o$. The central curvature radius is preferably 2 to 20 times as large as $R_o$ and more preferably at least 4 to 10 times as large as $R_o$.

In the case of an additional exemplary embodiment of the piston ring, the central region extends between 50 and 95, preferably between 60 and 90, and more preferably between and 85% of the height h of the piston ring. The majority of the piston ring jacket surface is thereby formed by the central part, which is intended to actually be in contact with an inner cylinder surface.

According to a further aspect of the present invention, a piston ring/piston combination with improved wear properties of the piston ring is provided. The piston ring/piston combination comprises a piston comprising a piston ring groove and a piston ring, as it is described above. The piston ring groove has a piston ring groove width B, and the piston ring has a radial thickness or also radial wall thickness W. An amount of an angle α between an axial direction and an averaged tangent (or average slope, respectively) of the central region is thereby less than or equal to the inverse tangent of a quotient, in the case of which the numerator is formed by the difference between the piston ring groove width B and the ring height h, and the divisor is formed by the radial thickness W of the piston ring. The numerator is thus defined by the axial play of the piston ring in the piston ring groove, while the divisor corresponds to the radial depth of the piston ring. The average slope of the central region of the piston ring is thus related to a possible degree of tilt or twisting of the piston ring, respectively, in the piston ring groove. It is thereby likewise possible to obtain a negative angle, provided that a positive angle is reached by twisting the ring, by means of which oil in a gap between piston and cylinder can be scraped in response to a downwards movement of the piston.

This aspect can likewise be described by the following equation:

$$[\alpha] \le \tan^{-1}\left(\frac{h_{axial}}{a_{ring}}\right) = \tan^{-1}\left(\frac{\text{axial clearance}}{\text{wall thickness}}\right)$$

In other words, the amount of the angle α is less than or equal to a maximal twist angle of the piston ring in the piston ring groove.

In the case of another exemplary embodiment of the piston ring/piston combination, an amount of an angle β between an axial direction and an averaged tangent (or an average slope, respectively) of the upper region lies above a sum of a value α and a value δ, which is between 30' and 180'. The averaged tangent of the central region is thus inclined to the axial direction by less than one half of an angle degree to three angle degrees than the averaged tangent of the upper region. The upper and lower region thereby form (averaged) a type of kink truncated cone.

THE DRAWINGS

The present invention will be described below by means of schematic illustrations of exemplary embodiments.

DETAILED DESCRIPTION

Figure 1:
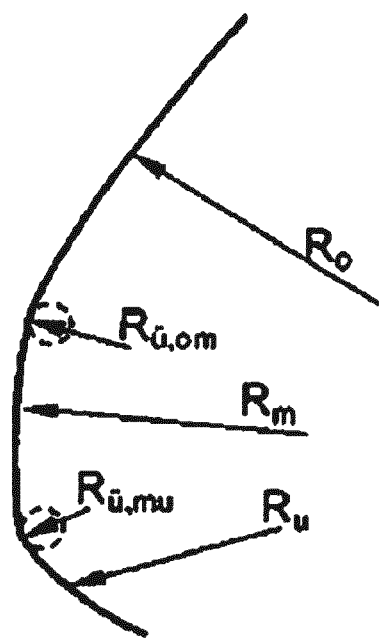
FIG. 1 shows a section through a running surface contour of a piston ring according to the invention according to a first embodiment.

Identical or similar reference numerals will be used below in the drawing as well as in the figures, in order to refer to identical or similar components and elements.

A differentiation will not be made below between the respective curvature radii of the upper, central, and lower region, and the respective regions, because these regions are in each case defined by the curvature radii thereof. The reference numerals $R_o$, $R_m$, and $R_u$ thus represent an axial region of the running surface contour as well as the respective n value of the curvature radius thereof.

FIG. 1 shows a section through a running surface contour of a piston ring according to the invention according to a first embodiment. In FIG. 1, the upper section of the contour of the running surface has a curvature radius $R_o$, which lies between the ring radius or half the ring diameter, respectively, of the installed piston ring and ∞. The upper region of the running surface contour is thereby inclined inwards, and forms a section of a torus surface. The upper region of the running surface contour faces the combustion chamber the most. An upper transition region $R_{ü,om}$, which forms a transition to a central region Rm of the piston ring, is located below the upper region $R_o$. The upper transition region $R_{ü,om}$ likewise forms a part of a torus surface. The curvature radius $R_{ü,om}$ is essentially likewise smaller than the curvature radius of the upper region. The curvature radius $R_{ü,on}$ is essentially likewise smaller than a height h of the piston ring at least by a factor 10. A central region $R_m$, which is to actually be in contact with an inner cylinder side, connects below the upper transition region $R_{ü,om}$. The central region of the contour of the running surface has a curvature radius $R_o$, which lies between the ring radius or half the ring diameter of the installed piston ring, respectively, and ∞. In FIG. 1, a further transition region, a lower transition region $R_{ü,mu}$, which forms a transition to a lower running surface contour section $R_u$, connects below the central region $R_m$. As does the upper transition region $R_{ü,om}$, the lower transition region $R_{ü,mu}$ also has a curvature radius, which is small with respect to the height of the piston ring, and which is maximally ⅒ of the height h. A lower region $R_u$ of the running surface contour, the curvature radius of which is smaller than the radius of the piston ring in an installed state, connects below the lower transition region.

Depending on the load scenario, a wear can be distributed in such a way by means of the design that, as a whole, it is less strong than for example in the case of conventional taper-faced or lug-taper-faced rings.

Figure 2:
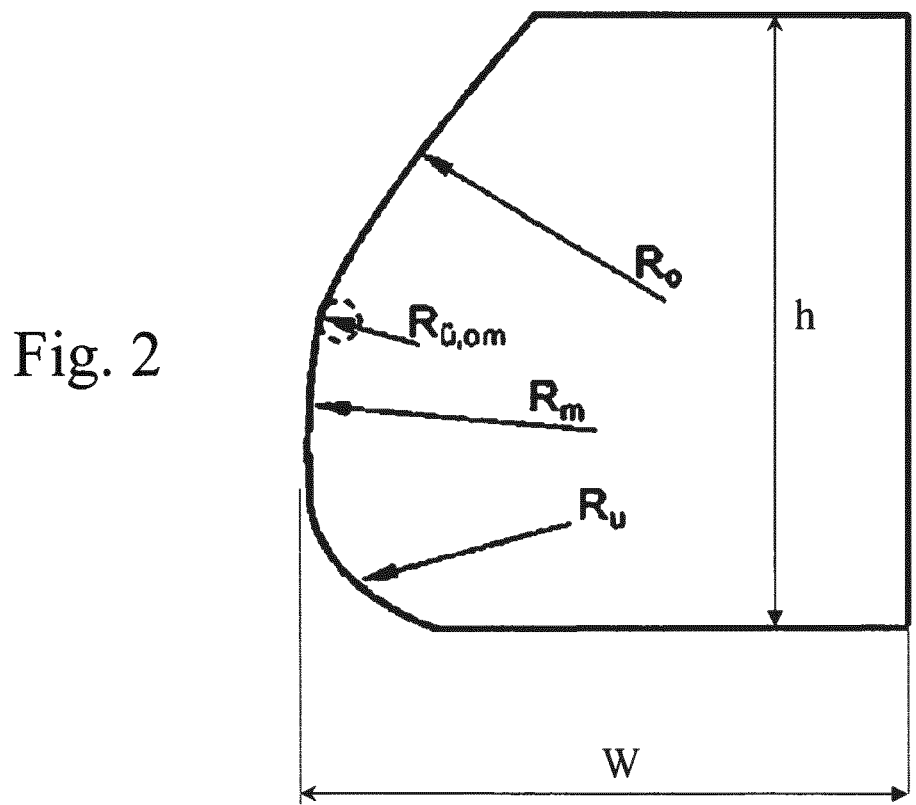
FIG. 2 illustrates a section through a running surface contour of a piston ring according to the invention according to a further embodiment.

FIG. 2 illustrates a section through a running surface contour of a piston ring according to the invention according to a further embodiment. In FIG. 2, the upper region $R_o$ and the central region $R_m$ have significantly larger curvature radii than in the case of the embodiment of FIG. 1. As in the case of FIG. 1, the upper transition region $R_{ü,om}$ has a relatively small value. The lower region $R_m$ of the running surface contour has a curvature radius, which is smaller as compared to FIG. 1. The central region $R_m$ of the running surface contour transitions seamlessly into the lower region $R_u$ of the running surface contour. The central region $R_m$ and the lower region $R_u$ of the running surface contour meet at a point, at which the respective tangents of the central region $R_m$ and of the lower region $R_u$ coincide. Due to the significantly smaller curvature radius, the lower transition region as it is used in FIG. 1, can be forgone. The curvature radius of the lower region $R_u$ is thereby at least 10 times smaller than that of the central region. However, the curvature radius of the lower region $R_u$ can also be at least 100-times smaller than that of the central region. In FIG. 2, the central region $R_m$ of the running surface contour transitions steadily and tangent-steadily into the lower region $R_u$ of the running surface contour.

Figure 3:
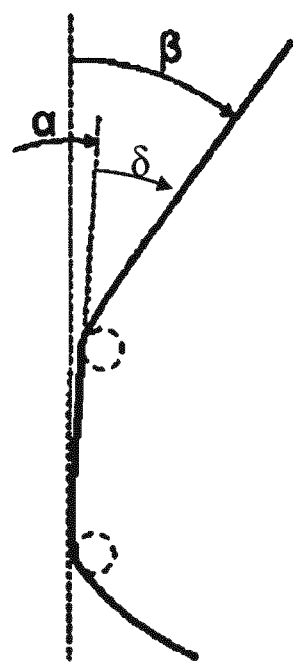
FIG. 3 shows the angle ratios between an upper region and a central region by means of a running surface contour of a piston ring according to the invention according to a further embodiment.

FIG. 3 shows the angle ratios between an upper region $R_o$ and a central region $R_m$ by means of a running surface contour of a piston ring according to the invention according to a further embodiment. In the figure, the upper region $R_o$ has a virtually infinitely large curvature radius. Due to the large curvature radius of the upper region $R_o$, all tangents at the upper region $R_o$ of the running surface contour coincide in the first approximation. In FIG. 3, the central region $R_m$ likewise has a virtually infinitely large curvature radius, all The large curvature radius of the central region $R_m$ has the effect that all tangents of this section of the running surface contour coincide in the first approximation. A transition region $R_{ü,om}$, which reaches a steady and tangent-steady transition between the upper region $R_o$ and the central region $R_m$, is arranged between the upper region $R_o$ and the central region $R_m$. Together, the shapes of the upper and central region form a type of bend truncated cone. The lower region $R_u$ is connected steadily and tangent-steadily to the central region $R_m$ via the lower transition region $R_{ü,mu}$. The figure thereby shows the difference of the cone angles $\alpha$ of the central region Rm of the running surface contour, and of the cone angle $\beta$ of the upper region $R_o$ of the running surface contour. The angle $\beta$ of the upper region $R_o$ thereby lies within and slightly above a value range, as it is known from taper-faced rings. The angle $\alpha$ of the central region $R_m$ lies significantly below the value $\beta$, and can be up to 2 angle degrees in a region between a few angular minutes.

Figure 4:
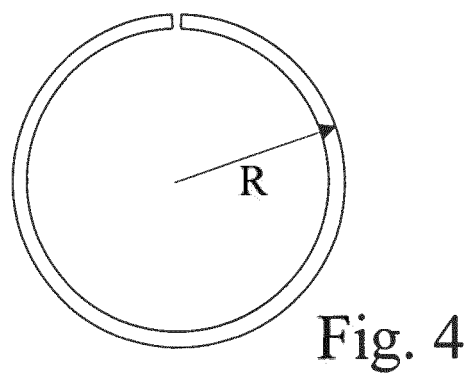
FIG. 4 illustrates a top view onto a piston ring according to the invention, in order to clarify the piston ring radius.

FIG. 4 illustrates a top view in an axial direction onto a piston ring according to the invention, whereby the figure clarifies the piston ring radius R.

In the case of all presented embodiments, the running surface contour is always steady and tangent-steady, even in the case of all transitions between the respective regions and between the respective regions and the respective transitions.

The invention claimed is:

1. A piston ring with improved wear properties, comprising:
   a running surface, an upper ring flank, a lower ring flank, and an inner surface,
   wherein the piston ring has a radius R of predetermined dimension and a ring height h of predetermined dimension,
   wherein in a radial section, the running surface has a running surface contour which comprises an upper region, a central region, and a lower region,
   wherein in the radial section between the upper region and the central region, the running surface contour has an upper transition region, and between the central region and the lower region the running surface contour has a lower transition region,
   wherein the upper region and the upper transition region in each case form parts of torus surfaces, the upper region of the running surface contour has a curvature radius $R_o$ of predetermined dimension,
   the central region of the running surface contour has a curvature radius $R_m$ of predetermined dimension,
   the lower region has a curvature radius $R_u$ of predetermined dimension, which is smaller in dimension than the ring radius R,
   the upper transition region has a rounding radius Rü, om of predetermined dimension which is $1/10^{th}$ to $1/30^{th}$ the dimension, of the ring height h, and
   the lower transition region has a rounding radius Rü, mu of predetermined dimension which is $1/10^{th}$ to $1/30^{th}$ the dimension, of the ring height h.

2. The piston ring according to claim 1, wherein an average tangent angle $\beta$ of the upper region of the running surface contour is between 2 to 40 times as large as an average tangent angle $\alpha$ of the central region.

3. The piston ring according to claim 2, wherein the average tangent angle $\beta$ is between 4 to 30 times.

4. The piston ring according to claim 2, wherein the average tangent angle $\beta$ is between 10 to 20 times.

5. The piston ring according to claim 1, wherein the curvature radius Ro is 1 to 4 times as large as, the ring radius R, and the curvature radius Ru is less than ½ of the ring radius R.

6. The piston ring according to claim 1, wherein the curvature radius Ro is 1 to 2 times as large as the ring radius R, the curvature radius Rm is 1 to 2 times as large as the ring radius R, and the curvature radius Ru is smaller than the ring height h.

7. The piston ring according to claim 1, wherein the curvature radius Ro is 1 to 1.5 as large as the ring radius R, the curvature radius Rm is 1 to 1.5 as large as the ring radius R, and the curvature radius Ru, is less than ½ the ring height h.

8. The piston ring according to claim 1, wherein the lower curvature radius Ru is larger than one or both of the rounding radius Rú, mu and Rü, om.

9. The piston ring according to claim 8, wherein the radius of curvature of the lower region Rü is at least 5 times as large as one or both of Rü,mu and Rü,mo.

10. The piston ring according to claim 8, wherein the radius of curvature of the lower region Rü is at least 10 times as large as one or both of Rü,mu and Rü,mo.

11. The piston ring according to claim 1, wherein the lower central curvature radius Rm is larger than the upper curvature radius Ro.

12. The piston according to claim 11, wherein the lower central curvature radius $R_m$ is 2 to 20 times as large as $R_o$.

13. The piston ring according to claim 11, wherein the lower central curvature radius $R_m$ is 4 to 10 times as large as $R_o$.

14. The piston ring according to claim 1, wherein an angle $\alpha$ between an axial direction and an average tangent of the central region is between −4 and +4°.

15. The piston according to claim 14, wherein the angle $\alpha$ is between 0° and 4°.

16. The piston according to claim 14, wherein the angle $\alpha$ is between 2° and 4°.

17. The piston ring according to claim 1, where in an angle $\beta$ between an axial direction and an averaged tangent of the upper region is larger than or equal to a sum of an angle $\alpha$ between an axial direction and an averaged tangent of the central region and a value $\delta$, which is between 30' and 180'.

18. A combination of a piston ring and a piston ring groove, comprising:

a piston ring having a running surface, an upper ring flank, a lower ring flank, and an inner surface, wherein the piston ring has a radius R of predetermined dimension, wherein in a radial section, the running surface has a running surface contour which comprises an upper region, a central region, and a lower region, wherein in the radial section between the upper region and the central region, the running surface contour has an upper transition region, and between the central region and the lower region the running surface contour has a lower transition region, wherein the upper region and the upper transition region in each case form parts of torus surfaces, the upper region of the running surface contour has a curvature radius $R_o$ of predetermined dimension, wherein the central region of the running surface contour has a curvature radius $R_m$ of predetermined dimension, wherein the lower region has a curvature radius $R_u$ of predetermined dimension, which is smaller than the ring radius R, wherein the upper transition region has a rounding radius Rü, om of predetermined dimension, which is $1/30^{th}$ to $1/10$th of the ring height h, and wherein the lower transition region has a rounding radius Rü, mu, which is $1/30$th to $1/10$th of the ring height h; and a piston ring groove in which the ring is received; and wherein an angle α is provided between an axial direction and an average tangent of the central region of the piston ring in the range of −4 and +4° which is less than or equal to a maximum twist angle of the piston ring in the piston ring groove.

19. A combination of a piston ring and a piston ring groove comprising:

a piston ring having a running surface, an upper ring flank, a lower ring flank, and an inner surface, wherein the piston ring has a radius R of predetermined dimension, wherein in a radial section, the running surface has a running surface contour which comprises an upper region, a central region, and a lower region, wherein in the radial section between the upper region and the central region, the running surface contour has an upper transition region, and between the central region and the lower region the running surface contour has a lower transition region, wherein the upper region and the upper transition region in each case form parts of torus surfaces, the upper region of the running surface contour has a curvature radius $R_o$ of predetermined dimension, wherein the central region of the running surface contour has a curvature radius $R_m$ of predetermined dimension, wherein the lower region has a curvature radius $R_u$ of predetermined dimension, which is less than the ring radius R, wherein the upper transition region has a rounding radius Rü, om of predetermined dimension, which is $1/30^{th}$ to $1/10$th of the ring height h, and wherein the lower transition region has a rounding radius Rü, mu of predetermined dimension, which is $1/30^{th}$ to $1/10$th of the ring height h; and a piston ring groove in which the ring is received; and wherein an angle β is provided between an axial direction and an averaged tangent of the upper region and wherein angle β is larger than or equal to a sum of an angle α between the axial direction and the averaged tangent of the central region and a value δ, which is between 30' and 180', and wherein the angle (α) is less than or equal to a maximum twist angle of the piston ring in the piston ring groove.

* * * * *